(12) United States Patent
Mori

(10) Patent No.: US 7,552,301 B2
(45) Date of Patent: Jun. 23, 2009

(54) INFORMATION PROCESSING APPARATUS AND MEMORY ACCESS ARRANGING METHOD

(75) Inventor: Atsuhiro Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 324 days.

(21) Appl. No.: 10/764,484

(22) Filed: Jan. 27, 2004

(65) Prior Publication Data

US 2004/0250038 A1 Dec. 9, 2004

(30) Foreign Application Priority Data

Jan. 27, 2003 (JP) .......................... P.2003-017437

(51) Int. Cl.
*G06F 13/10* (2006.01)

(52) U.S. Cl. ...................... 711/167; 711/158; 711/168; 711/169

(58) Field of Classification Search ................. 711/158, 711/167–169
See application file for complete search history.

(56) References Cited

U.S. PATENT DOCUMENTS

| | | | | |
|---|---|---|---|---|
| 3,603,935 | A * | 9/1971 | Moore | 711/151 |
| 4,096,571 | A * | 6/1978 | Vander Mey | 711/151 |
| 4,257,095 | A | 3/1981 | Nadir | |
| 4,271,467 | A * | 6/1981 | Holtey | 711/151 |
| 4,780,843 | A * | 10/1988 | Tietjen | 713/322 |
| 4,847,757 | A | 7/1989 | Smith | |
| 5,671,393 | A | 9/1997 | Yamaki et al. | |
| 6,006,303 | A * | 12/1999 | Barnaby et al. | 710/244 |
| 6,065,102 | A * | 5/2000 | Peters et al. | 711/151 |
| 6,125,421 | A * | 9/2000 | Roy | 711/5 |
| 6,205,523 | B1 * | 3/2001 | Joffe et al. | 711/150 |
| 6,292,807 | B1 * | 9/2001 | Larson | 707/201 |
| 6,480,904 | B1 * | 11/2002 | Kato et al. | 710/6 |
| 6,487,643 | B1 * | 11/2002 | Khare et al. | 711/150 |
| 6,499,087 | B1 * | 12/2002 | Fadavi-Ardekani et al. | 711/151 |

(Continued)

FOREIGN PATENT DOCUMENTS

GB         2170624 A         8/1986

(Continued)

OTHER PUBLICATIONS

European Search Report issued in corresponding European Patent Application No. 04001687.5-2210, dated Apr. 2, 2007.

(Continued)

*Primary Examiner*—Hyung S Sough
*Assistant Examiner*—Shawn Eland
(74) *Attorney, Agent, or Firm*—McDermott Will & Emery LLP (57) ABSTRACT

An information processing apparatus is provided which includes a processor for carrying out a pipeline processing over an instruction, a memory provided in the processor and input/output control means for giving access to the memory with a high priority, a memory access arranging method includes a step of causing a clock to be supplied to the processor to wait when a contention of access of the processor and the input/output control means to the memory is generated, a step of executing the access of the input/output control means to the memory, and a step of canceling the clock wait of the processor after ending the access of the input/output control means to the memory, and executing the access of the processor to the memory.

7 Claims, 7 Drawing Sheets

U.S. PATENT DOCUMENTS 6,557,085 B1 * 4/2003 Mattausch ................. 711/150
6,629,220 B1 * 9/2003 Dyer ......................... 711/158

FOREIGN PATENT DOCUMENTS

| JP | 61-049268 | 3/1986 |
| JP | 01-318139 | 12/1989 |
| JP | 9-198298 | 7/1997 |
| JP | 2000-20452 | 1/2001 |

OTHER PUBLICATIONS

Japanese Office Action with English Translation issued in Japanese Patent Application No. 2003-017437 dated on Apr. 10, 2008.

* cited by examiner

INFORMATION PROCESSING APPARATUS AND MEMORY ACCESS ARRANGING METHOD

BACKGROUND OF THE INVENTION

1. Field of the Invention

The present invention relates to an information processing apparatus comprising an external input/output mechanism capable of carrying out write or read at a high speed between a memory device provided in a processor and an outside, and a memory access arranging method in the case in which a contention of access to the memory device is generated.

2. Description of the Related Art

In the case in which write/read to/from one memory device is to be carried out by a plurality of control devices, conventionally, a dual port memory is used as the easiest implementing method. In recent years, however, importance has been attached to a system LSI in an LSI market and the scale of a circuit has been increased. For this reason, the dual port memory occupying a large chip area is disadvantageous in respect of a cost in the system LSI requiring a memory having a large capacity. Therefore, it can be proposed that a single port memory is used in order to reduce the chip area. Depending on a timing for giving access from a plurality of control devices, however, the contention of the access is generated. For this reason, it is necessary to arrange the access.

As a method of arranging access given from a plurality of control devices, conventionally, the access is arranged in the following manner. In the case in which access is given from a second control device having a higher priority than that of a first control device while the first control device gives access to a memory, the second control device is caused to wait (stand by) until the access of the first control device to the memory is ended. When the access of the first control device to the memory is ended, access is started to be given from the second control device to the memory. Moreover, the access of the first control device to the memory is entirely prohibited while the access is given from the second control device to the memory. Consequently, the second control device can give access to the memory with a priority over the first control device (for example, see JP-A-9-198298).

More specifically, during the execution of the access by the control device which first gives access, the control device giving access later cannot give access to the memory until the access of the control device which first gives access is ended.

However, it is supposed that access is to be given with a priority from any of the control devices. For example, in the case in which access is given from an external processor through an external input/output mechanism to a processor built-in memory, for example, the access given from the external processor to the processor built-in memory does not take a long time. However, the external processor requires a high-speed operation. For this reason, it has been demanded to always give access from the external processor with a priority.

In the application of the technique described above to a processor comprising the external input/output mechanism requiring high-speed access to the memory provided in the processor, when access from the external input/output mechanism to the memory is generated while a processor core gives access to the memory, the external input/output mechanism is caused to wait until the access of the processor core is ended. Consequently, the access speed of the external input/output mechanism is reduced.

More specifically, the access speed of the external input/output mechanism is reduced depending on the state of access of the processor to the memory in some cases. In the casein which this mechanism is applied to a data transfer through the external input/output mechanism from the external processor to the memory provided in the processor, accordingly, an external access speed is reduced, and furthermore, the operating speed of a final set is also reduced.

SUMMARY OF THE INVENTION

In order to solve the conventional problems, it is an object of the invention to provide an information processing apparatus which implements an external input/output mechanism capable of always giving high-speed access with a priority without a wait irrespective of the state of access given from a processor to a memory, and a memory access arranging method.

A first aspect of the invention is directed to an information processing apparatus comprising data storing means, first and second data input/output means for giving access to the data storing means, clock generating means for supplying a clock to the second data input/output means, switching means for switching access of the first data input/output means and the second data input/output means to the data storing means, and access arranging means for causing the clock for the second data input/output means to wait and executing the access of the first data input/output means earlier when a contention of the access of the first data input/output means and the second data input/output means to the data storing means is generated, and for starting the access of the second data input/output means after the access of the first data input/output means is ended.

According to the structure, when an access contention is generated in the first and second data input/output means for giving access to the data storing means, the clock of one of the data input/output means is caused to wait to carry out an access arrangement. Consequently, it is possible to always implement high-speed access with a priority without a wait from either of the first and second data input/output means.

A second aspect of the invention is directed to an information processing apparatus comprising a built-in memory, a processor for processing data stored in the built-in memory, clock generating means for supplying a clock signal to the processor, input/output control means for executing access to the built-in memory upon receipt of an instruction from an external control device, and access arranging means for generating a wait request signal to cause the clock signal to wait and carrying out access of the input/output control means with a priority when a contention of access of the processor and the input/output control means to the built-in memory is generated.

According to the structure, when an access contention is generated in the processor and the external control device which give access to the built-in memory, a priority is given to the access of the external control device, thereby carrying out the access arrangement. Consequently, it is possible to increase a data transfer speed from the external control device to the built-in memory.

A third aspect of the invention is directed to the information processing apparatus according to the second aspect of the invention, further comprising selecting means for switching the access of the processor and the input/output control means to the built-in memory, wherein the access arranging means outputs a control signal to the selecting means when a request for the access of the input/output control means to the built-in memory is generated during the access of the processor to the built-in memory, and the selecting means receiving the control signal switches the access of the processor to the access of the input/output control means to the built-in memory.

According to the structure, in the case in which the processor gives access to the built-in memory, the access of the processor is switched into the access of the input/output control means when data are written or read between the built-in memory and the external control device. Consequently, it is possible to implement the high-speed access of the external control device giving a priority to the processor.

A fourth aspect of the invention is directed to the information processing apparatus according to the second aspect of the invention, further comprising holding means for holding read data output from the built-in memory before a wait operation of the processor during the wait operation of the processor, wherein the access arranging means switches read data to be supplied to the processor between the read data output from the built-in memory and the read data held by the holding means.

According to the structure, also in the case in which the processor continuously gives access to the memory, the read data output from the built-in memory and the read data held by the holding means are switched. Consequently, it is possible to implement high-speed access without depending on the state of the access.

A fifth aspect of the invention is directed to a memory access arranging method of an information processing apparatus including data storing means and first and second data input/output means for giving access to the data storing means, comprising the steps of causing a clock for the second data input/output means to wait when a contention of the access of the first data input/output means and the second data input/output means to the data storing means is generated, executing the access of the first data input/output means earlier, and canceling the clock wait of the second data input/output means after ending the access of the first data input/output means, and executing the access of the second data input/output means.

According to the structure, when an access contention is generated in the first and second data input/output means for giving access to the data storing means, the clock of either of the data input/output means is caused to wait to carry out an access arrangement. Consequently, it is possible to always implement high-speed access with a priority without a wait from either of the first and second data input/output means.

A sixth aspect of the invention is directed to a memory access arranging method of an information processing apparatus including a processor for carrying out a pipeline processing over an instruction, a memory provided in the processor, and input/output control means for executing access to the memory with a higher priority than the processor, comprising the steps of generating a wait request signal for causing a clock supplied to the processor to wait when a contention of access of the processor and the input/output control means to the memory is generated, switching the access of the processor to the access of the input/output control means to the memory, and canceling the clock wait of the processor after ending the access of the input/output control means to the memory, and executing the access of the processor to the memory.

According to the structure, in the case in which the processor gives access to the built-in memory, the access of the processor is switched into the access of the input/output control means when data are written or read between the built-in memory and the outside. Consequently, it is possible to implement high-speed access with a priority over the processor. Moreover, it is possible to implement high-speed access capable of restarting the access by simply carrying out one pipeline stage wait in the case in which the contention of the access of the processor and the external input/output means is generated.

A seventh aspect of the invention is directed to a memory access arranging method of an information processing apparatus having a processor for carrying out a pipeline processing over an instruction, a memory provided in the processor, input/output control means for executing access to the memory with a higher priority than the processor, and holding means for holding read data output from the memory before a wait operation of the processor during the wait operation of the processor, comprising the steps of holding the read data output from the memory before the wait operation of the processor when a contention of read access of the input/output control means is generated for a period in which the processor gives continuous read access to the memory, causing a clock supplied to the processor to wait, executing the access of the input/output control means to the memory, and canceling the clock wait of the processor after ending the access of the input/output control means to the memory, supplying the data held in the holding means to the processor, and restarting the access of the processor to the memory.

According to the structure, also in the case in which the processor continuously gives access to the memory, the data held in the holding means are supplied to the processor and the access of the processor to the memory is restarted. Consequently, it is possible to implement high-speed access without depending on the state of the access.

DESCRIPTION OF THE PREFERRED EMBODIMENT

An embodiment of the invention will be described below with reference to the drawings.

First Embodiment

Figure 1:
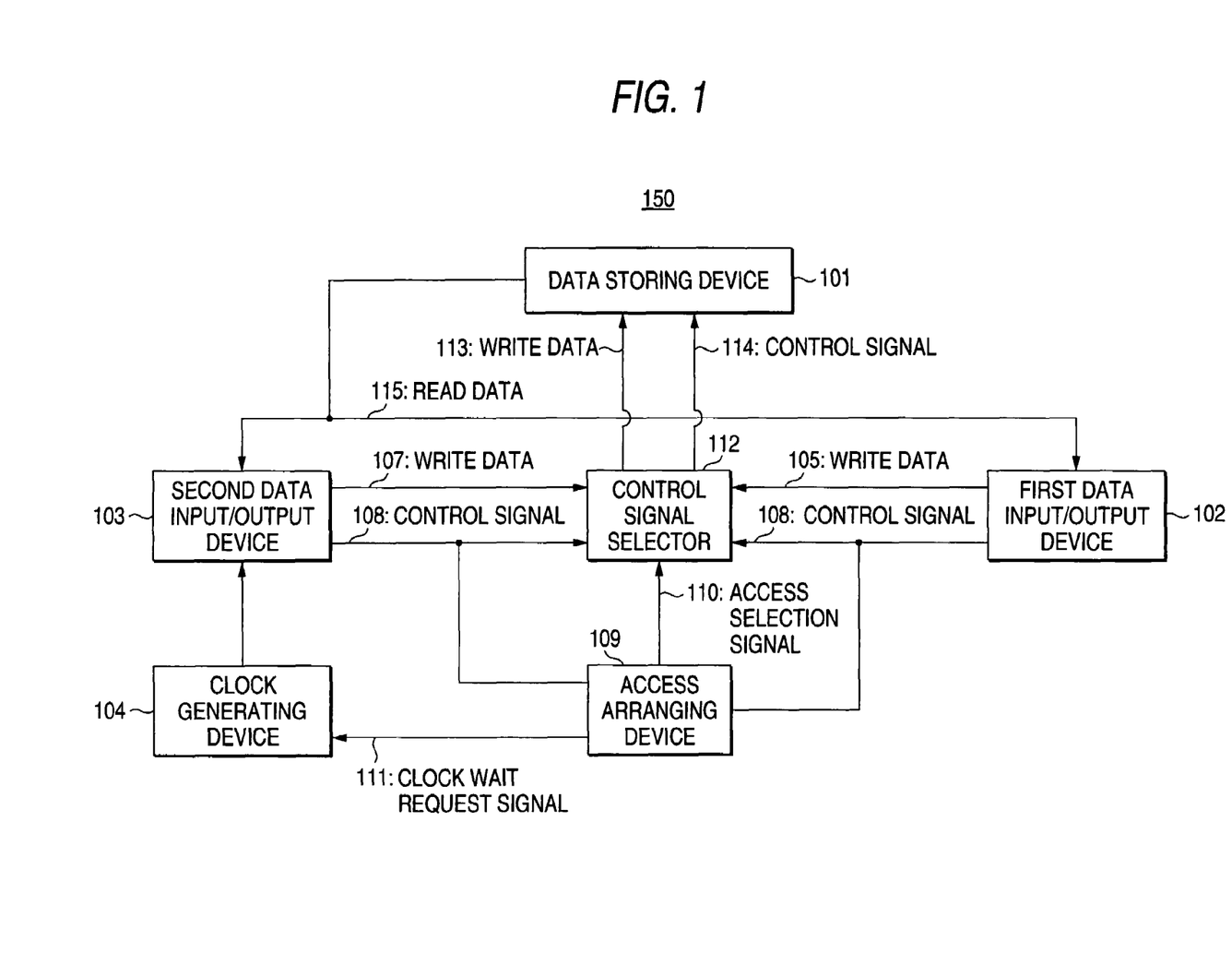
FIG. 1 is a diagram showing the structure of an information processing apparatus according to a first embodiment of the invention.

FIG. 1 is a diagram showing the structure of an information processing apparatus according to a first embodiment of the invention. In FIG. 1, an information processing apparatus 150 comprises a data storing device 101, a first data input/output device 102 having a high access priority for the data storing device 101, a second data input/output device 103 having a low access priority, a clock generating device 104 for supplying a clock to the second data input/output device 103, an access arranging device 109, and a control signal selector 112.

The access arranging device 109 monitors a control signal 106 of the first data input/output device 102 and a control signal 108 of the second data input/output device 103, and generates an access selection signal 110 for switching a control signal 114 and write data 113 which are to be supplied to the data storing device 101 between the first data input/output device 102 and the second data input/output device 103, and a clock wait request signal 111 for causing the second data input/output device 103 to wait when the contention of access of the first data input/output device 102 and the second data input/output device 103 to the data storing device 101 is generated.

Upon receipt of the access selection signal 110 output from the access arranging device 109, the control signal selector 112 switches write data 105 and the control signal 106 which are to be supplied from the first data input/output device 102 to the data storing device 101, and write data 107 and the control signal 108 which are to be supplied from the second data input/output device 103 to the data storing device 101.

Figure 2:
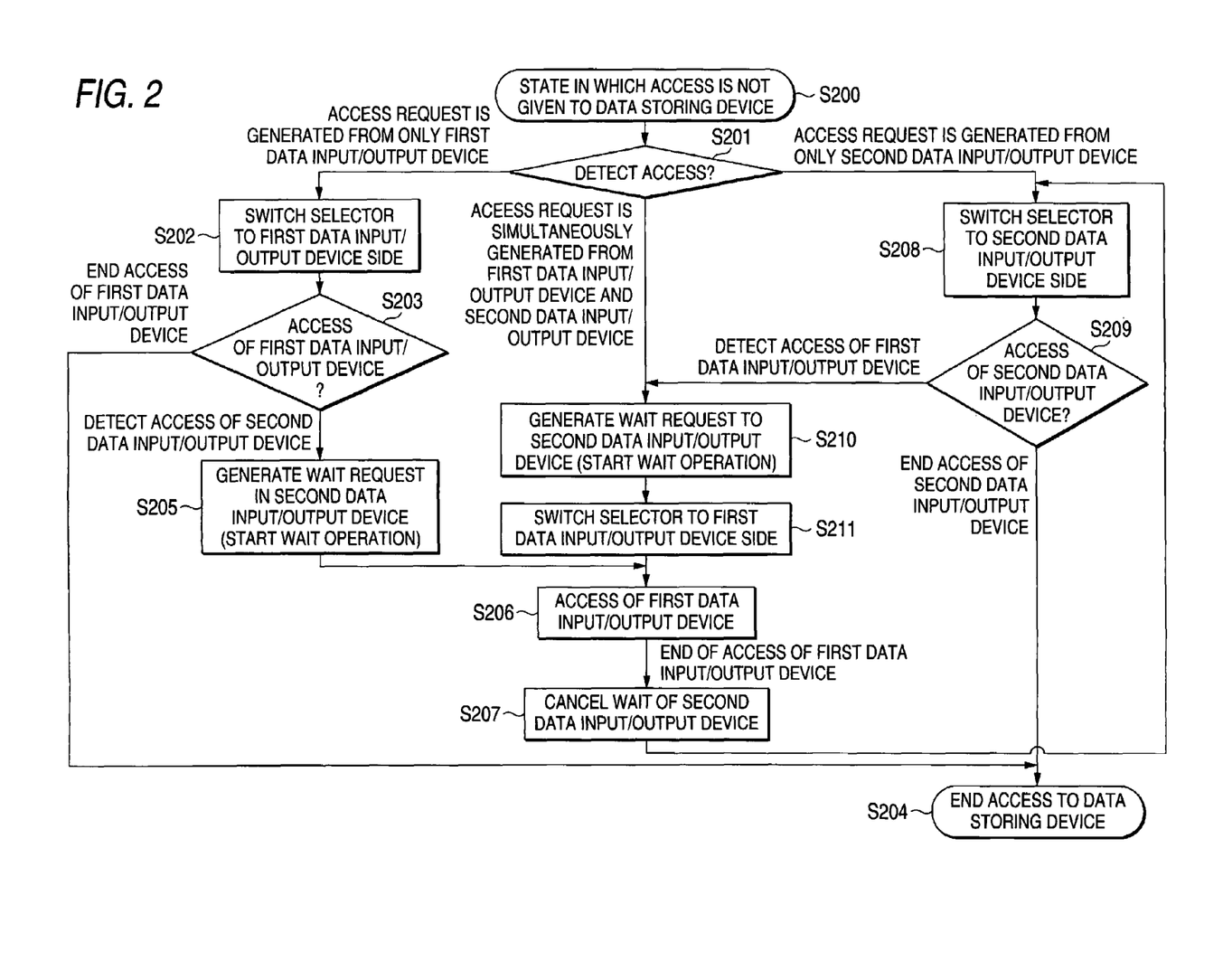
FIG. 2 is a flow chart showing the operation of the information processing apparatus illustrated in FIG. 1.

Referring to the embodiment having the above structure, an operation thereof will be described below with reference to a flow chart of FIG. 2. The access arranging device 109 monitors the state of the access of the first data input/output device 102 and the second data input/output device 103 to the data storing device 101 (S201). If the access is given to only to the first data input/output device 102 (A of S201) in a state in which the access is not given to the data storing device 101 (S200), the access arranging device 109 switches the control signal selector 112 to the first data input/output device 102 side (S202), and the first data input/output device 102 executes the access to the data storing device 101 (S203). When the access of the first data input/output device 102 to the data storing device 101 is ended (A of S203), then, the access to the data storing device 101 is ended (S204).

On the other hand, if the access is given from the second data input/output device 103 before the access of the first data input/output device 102 to the data storing device 101 is ended (B of S203), the access arranging device 109 detects an access contention and outputs the clock wait request signal 111 to the second data input/output device 103 and the second data input/output device 103 is brought into a wait state (S205). Thereafter, the first data input/output device 102 executes the access to the data storing device 101 (S206).

When the access of the first data input/output device 102 to the data storing device 101 is ended, the wait state of the second data input/output device 103 is cancelled (S207) and the access arranging device 109, switches the control signal selector 112 to the second data input/output device 103 side (S208) and the second data input/output device 103 executes the access to the data storing device 101 (S209).

If the access is given to only the second data input/output device 102 (C of S201) in a state in which the access is not given to the data storing device 101 (S200), similarly, the access arranging device 109 switches the control signal selector 112 to the second data input/output device 103 side (S208) and the second data input/output device 103 executes the access to the data storing device 101 (S209). If the access of the second data input/output device 103 to the data storing device 101 is ended (B of S209), then, the access to the data storing device 101 is ended (S204).

On the other hand, if the access is given from the first data input/output device 102 before the access of the second data input/output device 103 to the data storing device 101 is ended (A of S209) or the first data input/output device 102 and the second data input/output device 103 simultaneously give access to the data storing device 101 (B of S201) in a state in which the access is not given to the data storing device 101 (S200), the access arranging device 109 detects an access contention and outputs the clock wait request signal 111 to the second data input/output device 103 and the second data input/output device 103 is brought into a wait state (S210). Then, the access arranging device 109 switches the control signal selector 112 to the first data input/output device 102 side (S211) and the first data input/output device 102 executes the access to the data storing device 101 (S206). An operation to be carried out after the step S207 has been described above.

As described above, according to the embodiment, there are provided the data storing device 101 to be data storing means, the first data input/output device 102 to be first data input/output means, the second data input/output device 103 to be second data input/output means, the clock generating device 104 to be clock generating means, the control signal selector 112 to be switching means for switching access, and the access arranging device 109 to be access arranging means for arranging access. When the contention of the access given from the first data input/output device 102 and the second data input/output device 103 to the data storing device 101 is generated, the clock of the second data input/output device 103 is caused to wait and the access of the first data input/output device 102 is executed earlier. When the access of the first data input/output device 102 is ended, the clock wait of the second data input/output device 103 is cancelled and the access of the second data input/output device 103 is executed. Therefore, an access arrangement in which the first data input/output device 102 can always give access to the data storing device 101 with a priority can be implemented with such a small-scale circuit structure as to simply carry out the wait control of a clock.

Second Embodiment

Figure 3:
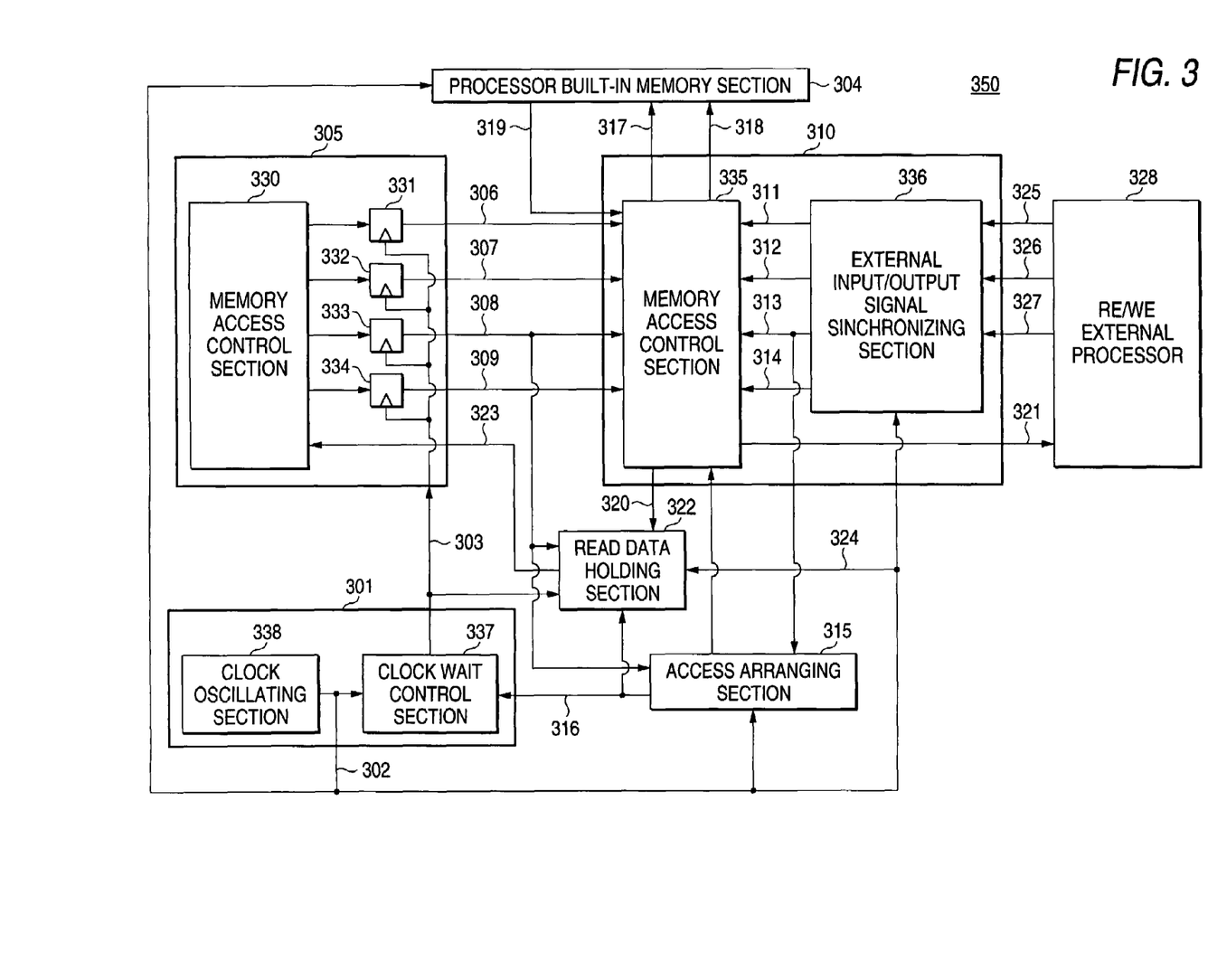
FIG. 3 is a block diagram showing the schematic structure of an information processing apparatus according to a second embodiment of the invention.

FIG. 3 is a block diagram showing the schematic structure of an information processing apparatus according to a second embodiment of the invention. In FIG. 3, an information processing apparatus 350 comprises a clock generating section 301, a processor built-in memory section 304 which is provided in a processor and can be accessed from the outside of the processor, a processor core section 305 for carrying out a pipeline processing over an instruction, an external input/output control section 310 having a higher priority of access to the processor built-in memory 304 than that of the processor core section 305, a read data holding section 322 for holding processor side read data 320 output from the external input/output control section 310, and an access arranging section 315 for generating a wait request signal 316 when access is generated from the processor core section 305 and the external input/output control section 310 at the same time.

The clock generating section 301 includes a clock oscillating section 338, and a clock wait control section 337 for stopping a clock to be supplied from the clock oscillating section 338 during the input of the wait request signal 316 and for generating a clock having a cycle which is integer times as much. A clock 302 has no wait control output from the clock oscillating section 338. A clock 303 is a wait controlled clock output from the clock wait control section 337.

The processor core section 305 has a memory access control section 330 for receiving read data 323 from the memory section 304, and a plurality of flip-flops 331, 332, 333 and 334, and generates a processor side address 306 for giving access to the memory section 304, a processor side chip select (CS) signal 307, a memory device control signal 308 such as a read enable signal (RE) and a write enable signal (WE), and processor side write data 309.

The external input/output control section 310 has an external input/output signal synchronizing section 336 and a memory access selector section 335. The external input/output signal synchronizing section 336 receives an external input/output address 325, an external input/output read enable/write enable (RE/WE) signal 326 and external input/output write data 327 and generates memory device control signals such as an external input/output side address 311 synchronized to give access to the processor built-in memory section 304, an external input/output side chip select (CS) signal 312 and an external input/output side write enable/read enable (WE/RE) signal 313, and external input/output side write data 314. The memory access selector section 335 switches the memory control signals and the write data which are sent from the external input/output signal synchronizing section 336 and the memory control signals and the write data which are sent from the processor core section 305, supplies write data 317 and a memory control signal 318 to the processor built-in memory 304, and switches read data 319 transmitted from the processor built-in memory 304 into the processor core section 305 and an external processor 328, thereby supplying the processor side read data (no holding) 320 to the read data holding section 322 and supplying external input/output side read data 321 to the external processor 328. The processor built-in memory 304 outputs the read data 319 to the memory access selector section 335.

The access arranging section 315 monitors the write/read enable signals 308 sent from the processor core section 305 and the write/read enable signals 313 generated in the external input/output control section 310 and supplies a selector control signal 324 to the memory access selector section 335 in the external input/output control section 310 in order to switch the memory control signals and the write/read data on the processor core section 305 side and the memory control signals and the write/read data on the external input/output control section 310 side. Moreover, the access arranging section 315 generates the wait request signal 316 for causing a clock supplied to the processor core section 305 to wait when access from the processor core section 305 to the processor built-in memory section 304 and access from the external input/output control section 310 to the processor built-in memory section 304 are generated at the same time.

The read data holding section 322 holds the processor side read data (no holding) 320 output from the memory access selector section 335 in the external input/output control section 310 and supplies the processor side read data 323 to the processor core section 305.

Figure 4:
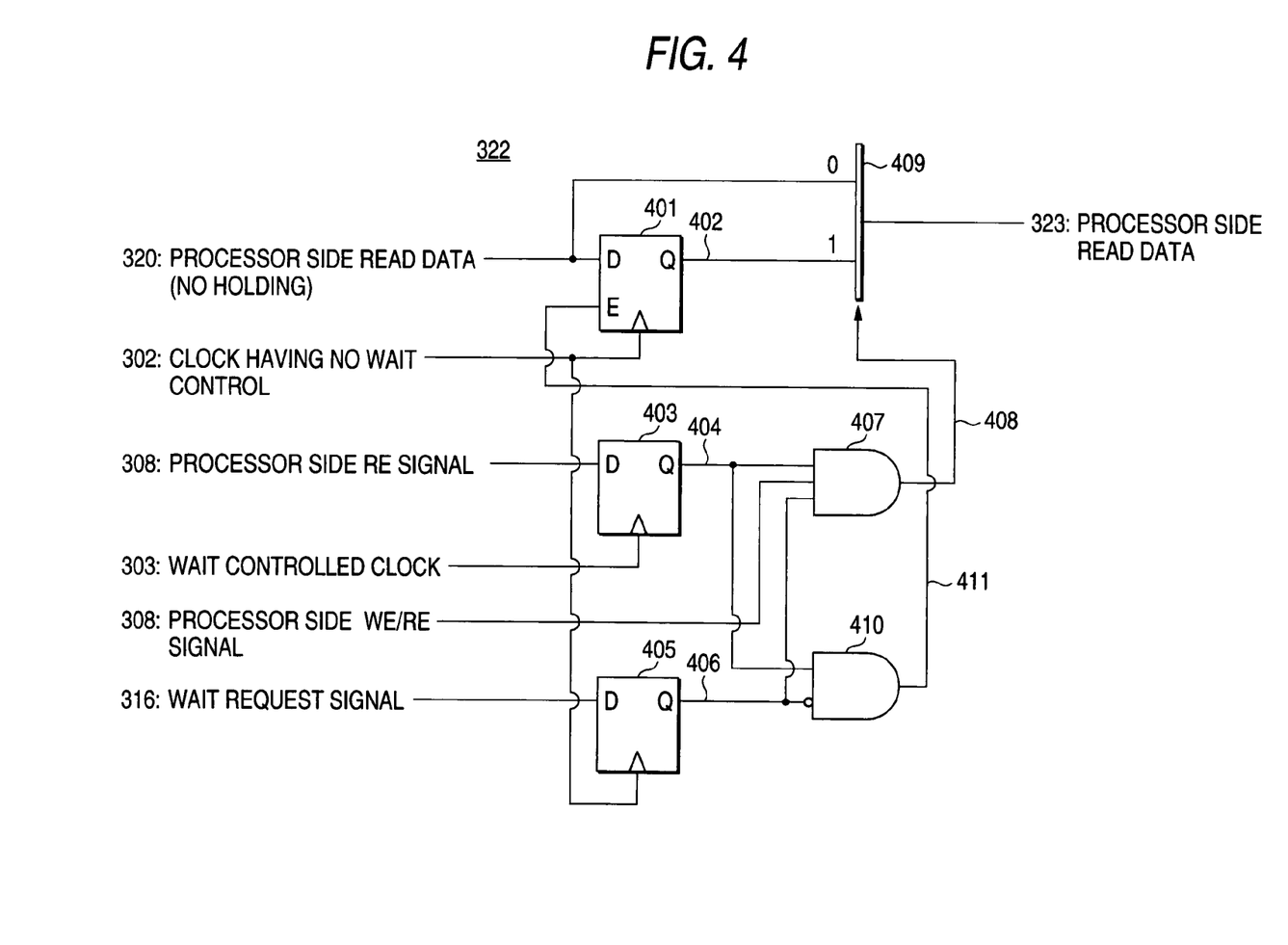
FIG. 4 is a circuit diagram showing the structure of a read data holding section according to the embodiment of the invention.

FIG. 4 is a circuit diagram showing the structure of the read data holding section 322. In FIG. 4, the read data holding section 322 comprises a flip-flop 401 for updating data at the rise of a next clock in a cycle in which a flip-flop enable signal 411 is "1" and for holding the read data 320 output from the memory access selector section 335 in the external input/output control section 310, a flip-flop 403 for delaying the timing of the processor side read enable (RE) signal 308 corresponding to one cycle of the clock 302 having no wait control, and a flip-flop 405 for delaying the timing of the wait request signal 316 corresponding to one cycle of the clock 302 having no wait control. Furthermore, the read data holding section 322 comprises an AND gate 407 for taking an AND of the processor side read enable (RE) signal 308, a processor side read enable signal 404 delayed by one cycle and a wait request signal 406 delayed by one cycle, a selector 409 for sending a hold data output 402 to the processor side read data 323 when a selector control signal 408 to be the output signal of the AND gate 407 is "1", and for outputting the read data 320 to the processor side read data 323 when the selector control signal 408 is "0", and an AND gate 410 for taking an AND of the processor side read enable signal delayed by one cycle 404 and the negative logic of the wait request signal delayed by one cycle 406 and for generating a flip-flop enable signal.

Figure 5:
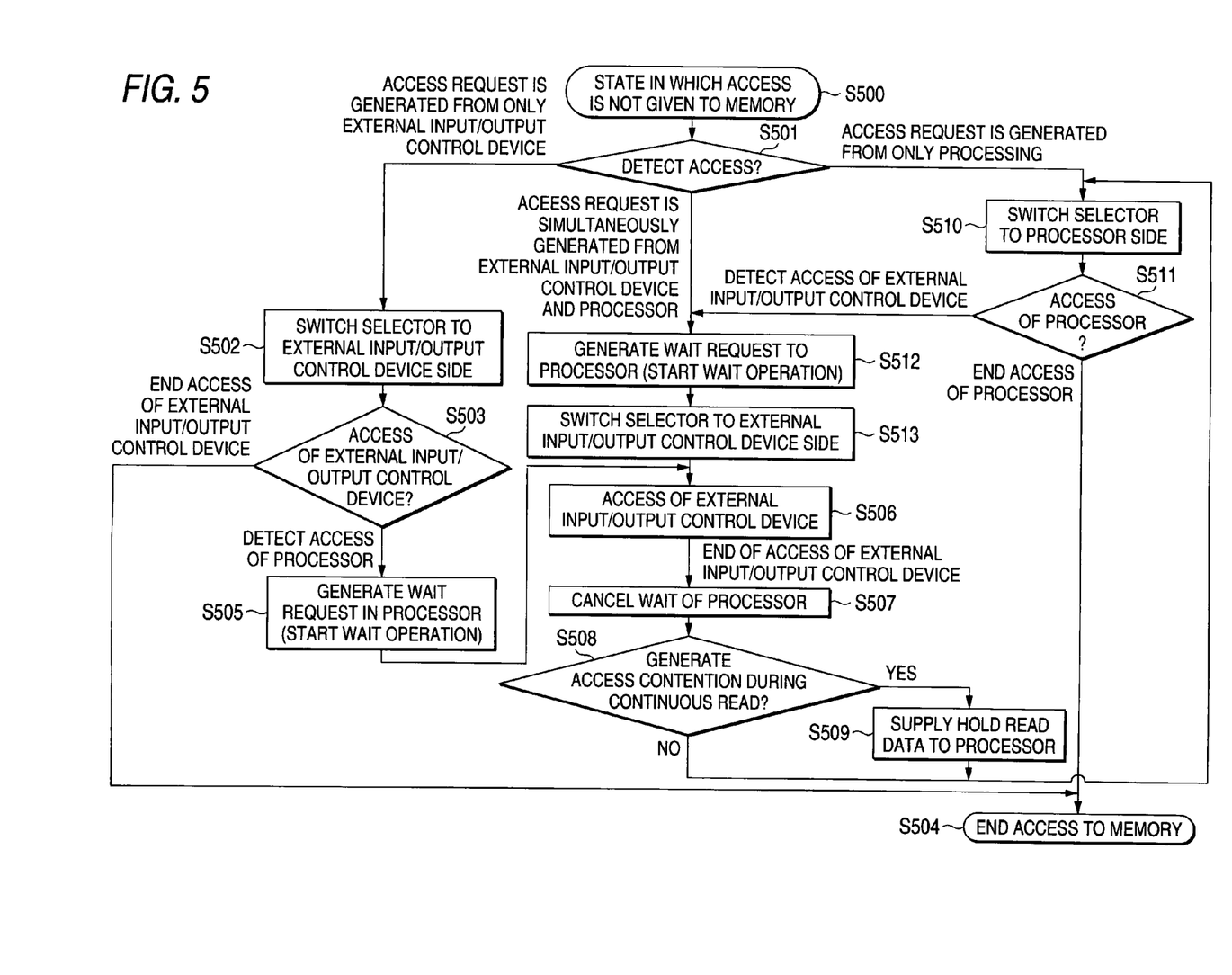
FIG. 5 is a flow chart showing the operation of the information processing apparatus illustrated in FIG. 3.

Referring to the embodiment having the above structure, an operation thereof will be described below with reference to a flow chart of FIG. 5. The memory 304 monitors the state of the access of the external input/output control section 310 and the processor core section 305 to the memory 304 (S501). If the access is given to only the external input/output control section 310 (A of S501) in a state in which the access is not given to the memory 304 (S500), the access arranging section 315 switches the memory access selector section 335 in the external input/output control section 310 to the external input/output control section 310 side (S502), and the external input/output control section 310 executes the access to the memory 304 (S503). When the access of the external input/output control section 310 to the memory 304 is ended (A of S503), then, the access to the memory 304 is ended (S504).

On the other hand, if the access is given from the processor core section 305 before the access of the external input/output control section 310 to the memory 304 is ended (B of S503), the access arranging section 315 detects an access contention and outputs the wait request signal 316 to the processor core section 305 and the processor core section 305 is brought into a wait state (S505). Thereafter, the external input/output control section 310 executes the access to the memory 304 (S506). When the access of the external input/output control section 310 to the memory 304 is ended, the wait state of the processor core section 305 is cancelled (S507).

If the access contention is caused during the generation of the continuous read access of the processor core section 305 to the memory 304 (Y of S508), the data held by the read data holding section 322 are supplied as the read data of the processor core section 305 (S509).

On the other hand, if the access contention is not caused during the generation of the continuous read access of the processor core section 305 to the memory 304 (N of S508), the processor side read data (no holding) 320 are supplied as the read data of the processor core section 305. Then, the access arranging section 315 switches the memory access selector section 335 in the external input/output control section 310 to the processor core section 305 side (S510) and the processor core section 305 executes access to the memory 304 (S511).

If the access is given to only the processor core section 305 (C of S501) in a state in which the access is not given to the memory 304 (S500), similarly, the access arranging section 315 switches the memory access selector section 335 in the external input/output control section 310 to the processor core section 305 side (S510) and the processor core section 305 executes the access to the memory 304 (S511). If the access of the processor core section 305 to the memory 304 is ended (B of S511), then, the access to the memory 304 is ended (S504).

On the other hand, if the access is given from the external input/output control section 310 before the access of the processor core section 305 to the memory 304 is ended (A of S511) or the external input/output control section 310 and the processor core section 305 simultaneously give access to the memory 304 (B of S501) in a state in which the access is not given to the memory 304 (S500), the access arranging section 315 detects an access contention and outputs the wait request signal 316 to the processor core section 305 and the processor core section 305 is brought into a wait state (S512). Then, the access arranging section 315 switches the memory access selector section 335 in the external input/output control section 310 to the external input/output control section 310 side (S513) and the external input/output control section 310 executes the access to the memory 304 (S506). A subsequent operation has been described above.

Figure 6:
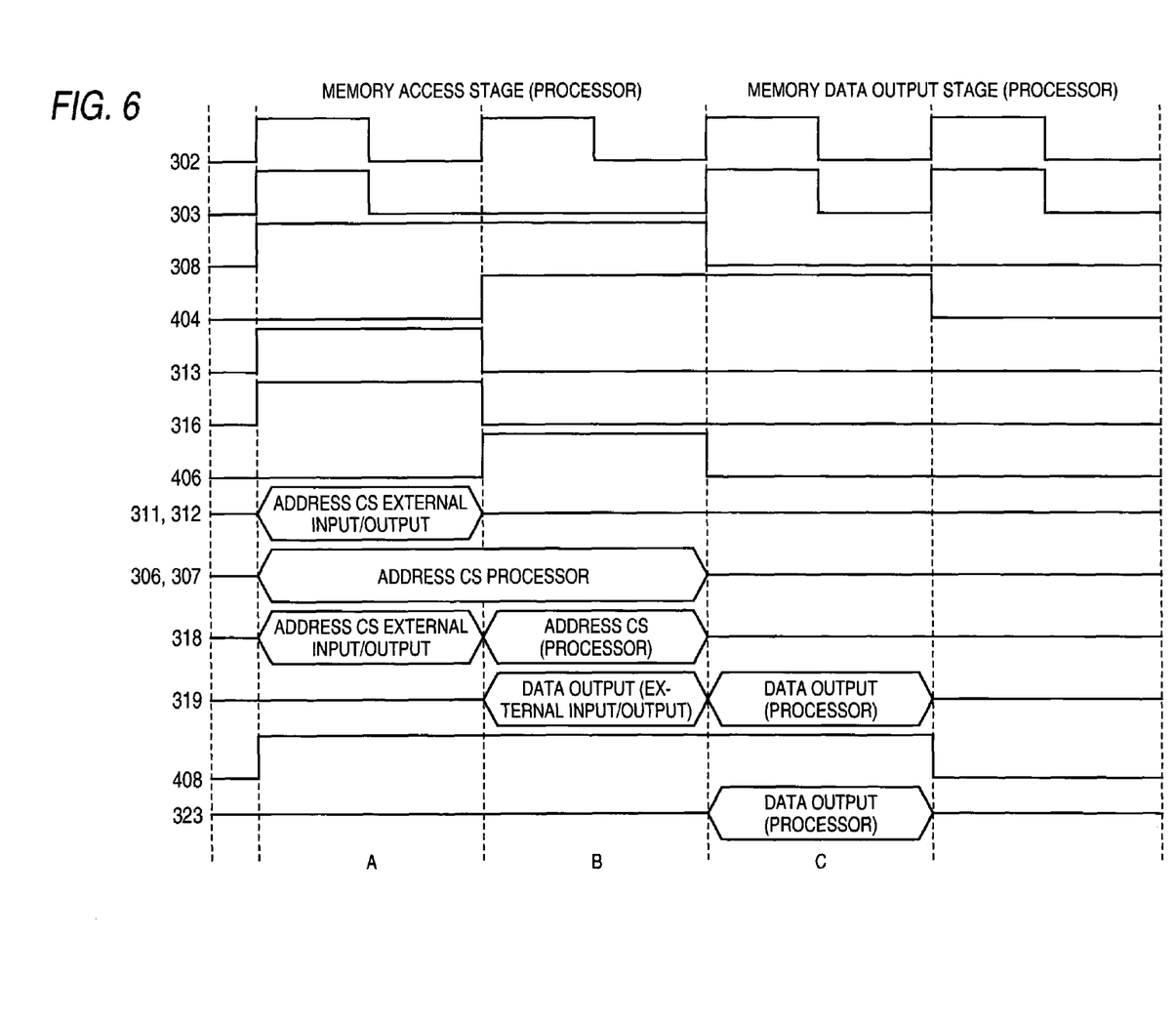
FIG. 6 is a timing chart showing an example of the operation of the information processing apparatus illustrated in FIG. 3 (the case in which a processor singly gives access)
Figure 7:
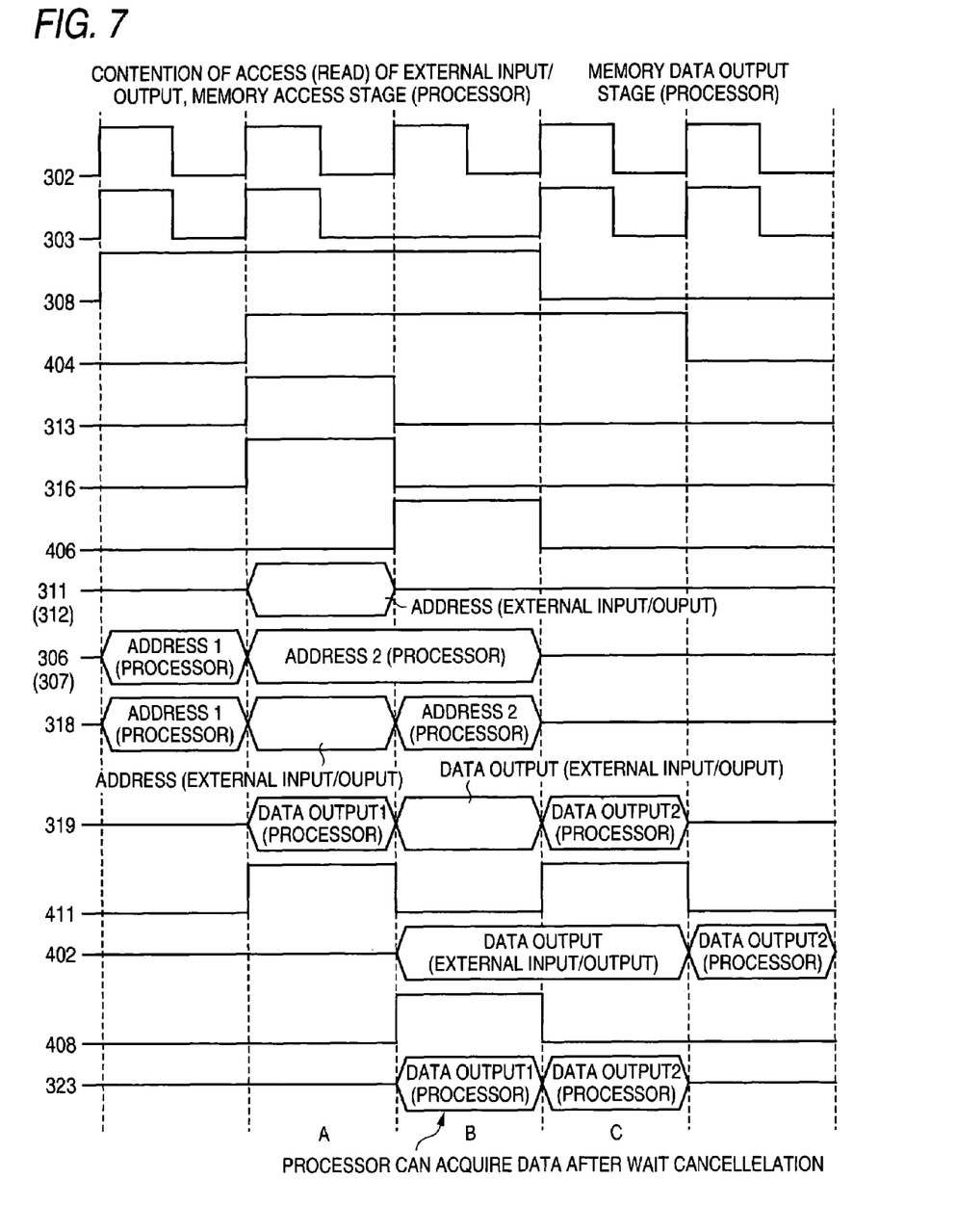
FIG. 7 is a timing chart showing an example of the operation of the information processing apparatus illustrated in FIG. 3 (the case in which the processor continuously gives access).

Referring to the information processing apparatus according to the embodiment of the invention, furthermore, the details of the operation will be described below with reference to timing charts of FIGS. 6 and 7. The timing chart of FIG. 6 shows the casein which the access from the external input/output control section 310 to the processor built-in memory 304 causes a contention when the processor core section 305 singly gives access to the processor built-in memory 304. The timing chart of FIG. 7 shows the case in which the access from the external input/output control section 310 to the processor built-in memory 304 causes a contention for a period in which the processor core section 305 continuously gives read access to the processor built-in memory 304.

In FIG. 6, when the processor side read enable signal 308 and the external input/output side read enable signal 313 are generated at the same time in a timing A of FIG. 6, the access arranging section 315 in FIG. 3 detects an access contention and supplies the wait request signal 316 to the clock generating section 301 in FIG. 3.

Consequently, the clock generating section 301 in FIG. 3 causes the wait controlled clock 303 to be supplied to the processor core section 305 to wait by one cycle in a timing B of FIG. 6. The processor side address 306, the processor side CS signal 307 and the processor side read enable (RE) signal 308 which are output from the processor core section 305 are sent through the flip-flops 331 to 334 provided in the processor core section 305, respectively. Therefore, the state of the output in the timing A is held in the timing B to be the wait period of the processor core section 305.

At this time, the access arranging section 315 in FIG. 3 controls the memory access selector section 335 in the external input/output control section 310 in FIG. 3. Then, the memory access selector section 335 in the external input/output control section 310 supplies the memory control signal from the external input/output control section 310 to the processor built-in memory 304 for a period in the timing A of FIG. 6, that is, a period provided one cycle before in which the processor core section 305 carries out the wait operation, and supplies the memory control signal from the processor core section 305 for a period in the timing B of FIG. 6, that is, a period in which the processor core section 305 carries out the wait operation.

Consequently, the processor built-in memory 304 outputs, as the read data 319, the read data obtained by the access of the external input/output control section 310 for a period in the timing B of FIG. 6, that is, a period in which the processor core section 305 carries out the wait operation, and outputs, as the read data 319, the read data obtained by the access of the processor core section 305 for period in a timing C of FIG. 6, that is, a period in a first one cycle in which the processor is returned from the wait. For the period in the timing C of FIG. 6, the selector control signal 408 in FIG. 4 is "0" and the read data 319 are supplied to the processor side read data 323 through the processor side read data (no holding) 320.

In the timing chart of FIG. 7, when access is given from the external input/output control section 310 to the processor built-in memory 304 for a period in a timing A of FIG. 7 while the processor core section 305 continuously executes the read access to the processor built-in memory 304, the wait request signal 316 is generated for the period in the timing A of FIG. 7 and the processor core section 305 starts the wait operation for the period in a timing B in the same manner as in the case of FIG. 6.

At this time, in the same manner as in the case of FIG. 6, the processor built-in memory 304 outputs the read data obtained by the access of the external input/output control section 310 to the read data 319 for the period in the timing B of FIG. 7, and outputs the read data obtained by the access of the processor core section 305 to the read data 319 for a period in a timing C of FIG. 7.

At this time, however, in a read instruction sent from the processor core section 305 to the processor built-in memory 304 one cycle before in which the contention of the access of the processor core section 305 to the processor built-in memory 304 and the access of the external input/output control section 310 is generated, read data on this instruction are output in the timing A of FIG. 7, and the processor core section 305 starts the wait operation in the next timing B. In the timing C in which the processor core section 305 is returned from the wait, therefore, the processor core section 305 cannot fetch necessary read data.

Therefore, the read data output in the timing A are held till the timing B by the flip-flop 401 in FIG. 4 and are output to the hold data output 402, and furthermore, a wait operation state set during the continuous read access of the processor core section 305 is detected by the AND gate 407 in FIG. 4 and the selector control signal 408 is set to be "1" in the timing B. Consequently, the selector 409 supplies the hold data output 402 to the processor side read data 323 so that the processor core section 305 can acquire data in the timing C.

On the other hand, the wait state is cancelled in the timing C. Therefore, the selector control signal 408 is returned to "0" and the selector 409 supplies the read data 319 to the processor side read data 323.

Also in the case in which the contention of the access given from the external input/output control section 310 is generated during the continuous access of the processor core section 305 to the processor built-in memory section 304 as shown in FIG. 7, thus, an access arrangement can be carried out.

As described above, according to the embodiment, there are provided the processor core section 305 to be a processor for carrying out a pipeline processing over an instruction, the processor built-in memory 304 to be a memory provided in a processor, the external input/output control section 310 to be input/output control means for executing access with a priority over the memory, the clock generating section 301 to be clock generating means for supplying a clock to the processor core section 305, and the access arranging section 315 to be access arranging means for monitoring the access of the processor core section 305 and the external input/output control section 310 to the processor built-in memory 304 and for carrying out an access arrangement. In the case in which the external input/output control section 310 causes an access contention for a period in which the processor core section 305 gives access to the processor built-in memory 304, the clock supplied to the processor core section 305 is caused to wait and the access of the external input/output control section 310 to the processor built-in memory 304 is executed. When the access of the external input/output control section 310 to the processor built-in memory 304 is ended, the clock wait of the processor core section 305 is canceled and the access of the processor core section 305 is executed.

In the case in which the processor core section 305 singly gives access to the processor built-in memory 304, consequently, the external input/output control section 310 capable of giving access to the processor built-in memory 304 at a high speed without a wait can be implemented by a small-scale circuit obtained by simply adding a circuit for causing the clock supplied to the processor core section 305 to wait.

In the case in which the access contention of the processor core section 305 and the external input/output means is generated, furthermore, the processor core section 305 is simply subjected to one pipeline stage wait so that an access arrangement capable of restarting the access can be implemented. Moreover, there is provided the read data holding section 322 to be holding means for holding data output from the memory. Also in the case in which the external input/output control section 310 gives access to the processor built-in memory 304 so that an access contention is generated when the processor core section 305 continuously gives read access to the processor built-in memory 304, the data held in the read data holding section 322 are supplied to the processor core section 305 and the access to the processor built-in memory 304 is restarted, and the access can also be given from the external input/output control section 310 during the continuous access of the processor core section 305.

According to the first and fifth aspects of the invention, it is possible to implement, with a small-scale circuit, an access arranging circuit for executing an access arrangement by simply causing the clock of either of two data input/output means to wait in the case in which an access contention is generated in the data input/output means for giving access to the data storing means.

According to the second and sixth aspects of the invention, it is possible to implement, with a priority over the processor, high-speed access having no wait by a small-scale circuit obtained by simply adding a circuit for causing the clock supplied to the processor to wait when writing or reading data between the processor built-in memory and the outside in the case in which the processor singly gives access to the built-in memory. Furthermore, it is possible to implement an access arranging circuit capable of restarting access by simply carrying out one pipeline stage wait when an access contention of the processor and the external input/output means is generated.

According to the third and seventh aspects of the invention, it is possible to implement external input/output means which can be executed without depending on the state of access also in the case in which the processor continuously gives access to the memory.

What is claimed is:

1. An information processing apparatus comprising:
   a data storing device;
   first and second data input/output devices giving access to the data storing device;
   a clock generating device comprising a clock oscillating section generating a normal clock signal to be supplied to the second data input/output device, and a clock wait control section generating a wait clock signal having a cycle which is integer times as much as the normal clock signal has;
   a control signal selector switching access of the first data input/output device or the second data input/output device to the data storing device; and
   an access arranging device causing the clock oscillating section to stop the normal clock signal to the second data input/output device for one clock cycle, causing the clock wait control section to supply the wait clock signal to the second data input/output device, not allowing the second data input/output device to access the data storing device for one clock cycle, executing the access of the first data input/output device for the one clock cycle when a contention of the access of the first data input/output device and the second data input/output device to the data storing device is generated, and starting the access of the second data input/output device after the access of the first data input/output device for the one clock cycle is ended.

2. An information processing apparatus comprising:
   a built-in memory;
   a processor for processing data stored in the built-in memory;
   a clock generating device comprising a clock oscillating section generating a normal clock signal to be supplied to the processor, and a clock wait control section generating a wait clock signal having a cycle which is integer times as much as the normal clock signal has;
   an input/output control device executing access to the built-in memory upon receipt of an instruction from an external control device; and
   an access arranging device causing the clock oscillating section to stop the normal clock signal for one clock cycle, causing the clock wait control section to supply the wait clock signal to the processor, and carrying out access of the input/output control device with a priority when a contention of access of the processor and the input/output control device to the built-in memory is generated.

3. The information processing apparatus according to claim 2, further comprising a selecting device switching the access of the processor and the input/output control device to the built-in memory,
   wherein the access arranging device outputs a control signal to the selecting device when a request for the access of the input/output control device to the built-in memory is generated during the access of the processor to the built-in memory, and
   the selecting device receiving the control signal switches the access of the processor to the access of the input/output control device to the built-in memory.

4. The information processing apparatus according to claim 2, further comprising a holding device for holding read data output from the built-in memory before a wait operation of the processor during the wait operation of the processor,
   wherein the access arranging device switches read data to be supplied to the processor between the read data output from the built-in memory and the read data held by the holding device.

5. A memory access arranging method of an information processing apparatus including data storing device, first and second data input/output devices giving access to the data storing device, and a clock generating device comprising a clock oscillating section generating a normal clock signal for supplying to the second data input/output device and a clock wait control section generating a wait clock signal having a cycle which is integer times as much as the normal clock signal has, the method comprising the steps of:
   providing the normal clock signal to the first and second data input/output devices;
   providing the clock wait signal to cause the normal clock signal for the second data input/output device to be stopped for one clock cycle and not allowing the second data input/output device to access the data storing device for one clock cycle when a contention of the access of the first data input/output device and the second data input/output device to the data storing device is generated;

executing the access of the first data input/output device earlier than the second data input/output device; and canceling the stop of the clock signal of the second data input/output device after ending the access of the first data input/output device, and executing the access of the second data input/output device.

6. A memory access arranging method of an information processing apparatus including a processor for carrying out a pipeline processing over an instruction, a memory provided in the processor, and an input/output control device executing access to the memory with a higher priority than the processor, and a clock generating device comprising a clock oscillating section generating a normal clock signal for supplying to the processor and the data input/output device, and a clock wait control section generating a wait clock signal having a cycle which is integer times as much as the normal clock signal has, the method comprising the steps of:

providing the normal clock signal to the processor and the data input/output device;

generating a wait request signal for causing a clock signal supplied to the processor to be stopped for one clock cycle when a contention of access of the processor and the input/output control device to the memory is generated;

providing the clock wait signal to cause the normal clock signal for the processor to be stopped for one clock cycle and not allowing the processor to access the memory for one clock cycle when a contention of the access of the data input/output device and the processor to the memory is generated;

switching the access of the processor to the access of the input/output control device to the memory; and canceling the wait request signal after ending the access of the input/output control device to the memory, and executing the access of the processor to the memory.

7. A memory access arranging method of an information processing apparatus having a processor for carrying out a pipeline processing over an instruction, a memory provided in the processor, an input/output control device for executing access to the memory with a higher priority than the processor, a clock generating device comprising a clock oscillating section generating a normal clock signal for supplying to the processor and the data input/output device, and a clock wait control section generating a wait clock signal having a cycle which is integer times as much as the normal clock signal has, and a holding device for holding read data output from the memory before a wait operation of the processor during the wait operation of the processor, comprising the steps of:

providing the normal clock signal to the processor and the data input/output device;

holding the read data output from the memory before the wait operation of the processor when a contention of read access of the input/output control device is generated for a period in which the processor gives continuous read access to the memory;

providing the clock wait signal to cause the normal clock signal for the processor to be stopped;

executing the access of the input/output control device to the memory; and canceling the stop of the clock signal of the processor after ending the access of the input/output control device to the memory, supplying the data held in the holding device to the processor, and restarting the access of the processor to the memory.

* * * * *